No. 731,978. Patented June 23, 1903.

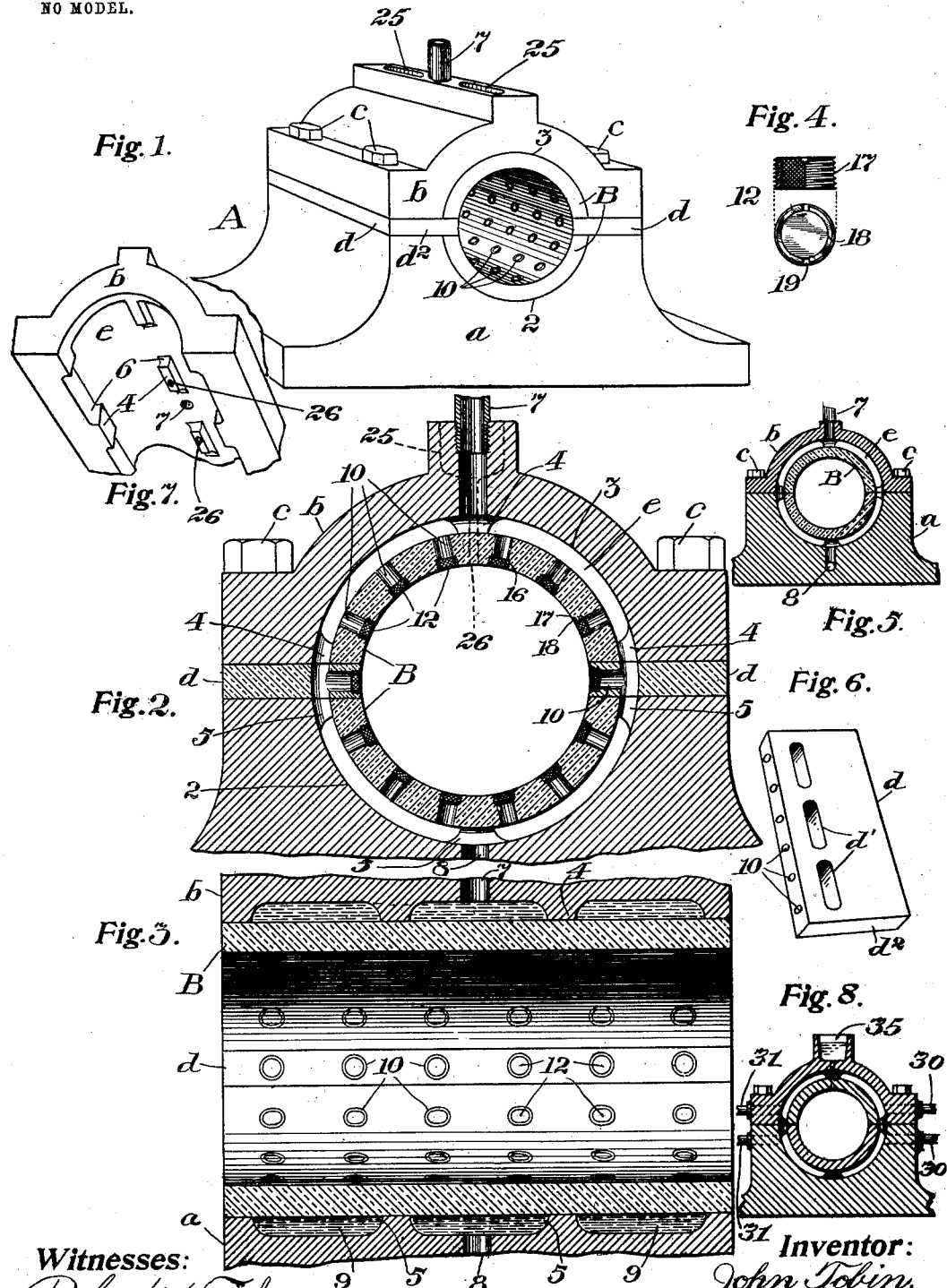

UNITED STATES PATENT OFFICE.

JOHN TOBIN, OF SAN FRANCISCO, CALIFORNIA; ALICIA TOBIN, ADMINISTRATRIX OF SAID JOHN TOBIN, DECEASED, ASSIGNOR OF ONE-HALF TO MONTROSE R. RICHARD, OF NEW YORK, N. Y.

JOURNAL-BEARING.

SPECIFICATION forming part of Letters Patent No. 731,978, dated June 23, 1903.

Application filed July 9, 1902. Serial No. 114,865. (No model.)

*To all whom it may concern:*

Be it known that I, JOHN TOBIN, a citizen of the United States, residing in San Francisco, in the county of San Francisco and State of California, have invented certain new and useful Improvements in Journal-Bearings, of which the following is a specification.

This invention relates to bearings for journals; and it consists, substantially, in the improvements hereinafter particularly described.

The invention has reference more especially to refrigerated or water-cooled bearings such as are employed for journals which are operated at high speeds and under great pressure—as in marine and other engines, for instance; and the principal object of the invention is to provide simple means for preventing injurious heating of either the bearing or journal and to render the bearing more effective and reliable than in many instances hitherto.

A further object is to provide means for admitting or delivering water or other cooling medium to the actual working surfaces of the bearing and journal on the development at or in the vicinity of such surfaces of a temperature of predetermined degree and also to simplify the general construction and organization of the parts or elements constituting the bearing.

The above and additional objects are attained by means substantially such as are illustrated in the accompanying drawings, in which—

Figure 1 is a view in perspective, partly broken off at one side, of a journal box or bearing embodying my improvements; and Fig. 2 is an enlarged transverse sectional view thereof, broken away at the lower part. Fig. 3 is a longitudinal sectional view, also enlarged and broken away both at the upper and lower parts thereof. Fig. 4 is an enlarged detail view, in part section, of one of the holders for the fusible disks or plugs employed in the practice of my invention, said view also showing a disk in the holder. Fig. 5 is a sectional view, on reduced scale, of the structure shown in Fig. 1, said view showing the omission of the liner between the adjacent faces of the bearing and the cap therefor. Fig. 6 is a view in detail indicating the construction of liner preferably employed in the embodiment of my invention herein shown, and Fig. 7 is also a view is detail showing more clearly the means for forming the water-chambers intermediate the brass or bushing of the bearing and the adjacent surfaces of bearing and its cap. Fig. 8 is a sectional view of a modification.

Before proceeding with a more detailed description it may be stated that my improvements are applicable to most any of the water-cooled or similarly-refrigerated journal boxes or bearings at present in use; but for the purposes of illustration I have herein represented a preferred embodiment thereof which is both simple in construction and effective in operation.

It has been common in many instances heretofore to provide a journal box or bearing with means for maintaining a circulation of water or other refrigerant around the exterior of the usual brass or bushing therein; but inasmuch as the heating of the journal and bearing takes place at the portions thereof in actual frictional contact it frequently happens that the thickness of the brass renders the refrigerant of no practical avail whatever in preventing or overcoming the injurious effects of overheating of the parts.

In carrying my invention into effect I provide a suitable chamber or chambers between the brass or bushing and the interior surface of the journal box or bearing, and through said chamber or chambers water or other refrigerant is caused to flow continuously in any suitable manner. I construct the brass, preferably at equidistant points, with suitable holes or openings extending all the way through the same and forming means of communication between the interior of the brass and the water or refrigerating chamber or chambers, said holes or openings being normally closed at the interior surface of the brass by means of suitable plugs or disks of any suitable material which will fuse or melt at a known or predetermined temperature, by which to permit the water or other refrigerant to flow to the working faces of the bearing and journal and thereby cool such surfaces in the desired manner.

My improvements are based upon the principle of the thermostat, as will be seen, and many of the metals or compositions thereof may be employed for the fusible plugs or disks, it being understood that a material should be employed having a fusing or melting point considerably below the temperature or degree of heat which would be injurious or disastrous to the journal and its bearing. For bearings for the journals of shafts of marine and other engines 210° Fahrenheit is an approximate fusible or melting point for the plugs or disks and which may be obtained from a composition of tin, (nineteen,) lead, (thirty-one,) and bismuth, (fifty,) although it will be understood that I am not limited to the particular material used. The inner surfaces of the plugs or disks are flush with the inner or working surface of the brass or bushing of the bearing, and the operation of my invention will be readily understood.

Specific reference being had to the accompanying drawings by the designating characters marked thereon, A represents a journal box or bearing constructed and organized in accordance with my invention, said box or bearing comprising the usual base or bed $a$ and cap $b$ therefor, the adjacent faces of said base and cap being correspondingly recessed at 2 3 to constitute substantially a circular opening in which is seated or contained the brass or bushing B, in contact with the inner surface of which the journal (not shown) operates or works, the external diameter of said brass or bushing being less than the diametric distance between the walls of such opening, as and for the purpose hereinafter understood. The cap $b$ is detachably secured to the base or bed $a$ by means of bolts $c$ $c$ or in any other suitable way, and I may or may not employ a liner between the meeting portions of said cap and base. Preferably I employ a liner $d$ of special construction about to be described, and I also give to the adjacent curved or recessed faces of the cap and base a special construction by which to derive the chamber or chambers $e$ for the water or other refrigerant. Thus I provide said curved or recessed faces 2 3 with corresponding preferably equidistant longitudinal ribs 4 5, formed at corresponding points with slots or notches 6, (see Fig. 7,) the inner edges of said ribs fitting the outer surface of the brass or bushing B within the box or bearing, and thereby forming said chambers $e$, which are in communication and which are continuously supplied through inlet-pipe 7 with water or other cooling agent 9, which may pass off through an outlet 8 therefor, as shown. The liner $d$ is also formed at corresponding points with chambers $d'$, communicating with the chambers $e$; but said liner is sometimes dispensed with, as indicated in Fig. 5, and in either case the brass or bushing B is preferably formed of hemispherical sections. As shown in Figs. 1 and 2, the liner is formed with a portion $d^2$, fitting between the adjacent edges of such hemispherical sections. The said brass or bushing and the extension of said liner are each formed at suitable intervals with holes or openings 10, communicating with the said water or refrigerant chambers $d'$ and $e$ as well as with the interior of the bearing, as shown; but normally said openings are each closed at the inner surface of the brass or bushing by means of a plug or disk 12, of any suitable material, as metal, for instance, which will fuse or melt at a known or given temperature. In this way communication between said water or refrigerant chambers and the interior of the box or bearing is maintained closed or shut off during the normal operations of the journal; but when the working faces of the journal and brass become heated up to or beyond a certain point or degree the said plugs or disks will fuse or melt, whereupon the water or other refrigerant is admitted directly to the working faces of the parts through the said openings 10 in a manner quite apparent. The water thus admitted between the working faces of the bearing and journal forms with the oil usually supplied to such faces an emulsion which has superior qualities as a lubricant, and thus are the injurious effects of overheating of the bearing or journal entirely overcome or prevented. I may secure the said fusible plugs or disks in place within the openings 10 in any suitable way; but preferably I tap the walls of such openings for a suitable distance from the inner surface of the brass or bushing B, as at 16, and I insert in the openings the threaded portions 17 of suitable ferrules 18, in the inner ends of which the said fusible plugs or disks are held or contained. The said ferrules are each notched, as at 19, to receive the end of a screw-driver or other implement for the purpose of adjusting the ferrules to bring the surfaces of the plugs or disks flush or even with the inner surface of the brass or bushing, and it is evident that the said plugs or disks may readily be replaced from time to time as occasion may require. It is thus apparent that I have provided simple and effective means for the purpose described, and it will of course be understood that I am not limited to the precise details herein set forth, since departures therefrom may be made and be within the scope of my invention.

As indicated at 25, Fig. 1, suitable provision is made for containing oil or other lubricant, which is supplied to the working surfaces of the bearing and journal in the ordinary way, the dotted lines, Fig. 2, indicating also the same provision, the oil or lubricant flowing to the working surfaces through conduits, the inner terminals of which are indicated at 26 in Fig. 7.

In Fig. 8 I have shown water-inlet pipes 30 and water-outlet pipes 31 located at the sides of the bearing and also wherein an oil-box 35 is designated at the top of the cap of the bearing for containing oil or other lubricant, which is allowed to flow by gravity to the working surfaces of the bearing and journal in the ordinary or well-known way. My invention is intended to comprehend all forms of bearing herein shown, and the said construction of Fig. 8 is also capable of variation without departure from my invention.

Having described my invention, I claim—

1. A journal-box comprising a base and a cap therefor having the adjacent faces thereof curved or recessed to constitute substantially a circular opening, said faces each being provided with notched ribs, a hollow brass located within said opening with its outer surface in contact with said ribs, thereby forming communicating chambers for a refrigerant, said brass having radial openings therein leading to said chambers, and the inner surface of the brass constituting a direct bearing for a journal, and means within said radial openings adapted to operate at a predetermined temperature to establish communication between said chambers and the interior of the brass.

2. A journal-box comprising a base and a cap therefor having the adjacent faces thereof curved or recessed to constitute substantially a circular opening, said faces each being provided with notched ribs, a hollow brass located in said opening with its outer surface in contact with said ribs, thereby forming communicating chambers for a refrigerant, said base and cap having an inlet and outlet for said chambers, and said brass having radial openings therein leading to the chambers and the inner surface of the brass constituting a direct bearing for a journal, and fusible plugs located in said radial openings and adapted to operate at a predetermined temperature to establish communication between said chambers and the interior of the brass.

3. A journal-box comprising a base and a cap therefor having the adjacent faces thereof curved or recessed to constitute substantially a circular opening, said faces each being provided with notched ribs, a hollow brass formed in duplicate sections and located in said opening with its outer surface in contact with said ribs, thereby forming communicating chambers for a refrigerant, said sections having radial openings therein leading to said chambers, a liner intermediate the sections of the brass and formed with chambers communicating with the chambers first named, said liner also having radial openings leading to the chambers therein, and the inner surfaces of said liner and said brass-sections constituting a direct bearing for a journal, and means fitting the said radial openings adapted to operate at a predetermined temperature to establish communication between said chambers and said inner surfaces of the brass and liner.

4. A journal-box comprising a base and a cap therefor having the adjacent faces thereof curved or recessed to constitute substantially a circular opening, said faces each being provided with notched ribs, a hollow brass formed in duplicate sections and located in said opening with its outer surface in contact with said ribs, thereby forming communicating chambers for a refrigerant, said sections having radial openings therein leading to said chambers, a liner intermediate the sections of the brass and formed with chambers communicating with the chambers first named, said liner also having radial openings leading to the chambers therein, and the inner surfaces of said liner and said brass-sections constituting a direct bearing for a journal, and fusible plugs fitting the said radial openings adapted to operate at a predetermined temperature to establish communication between said chamber and said inner surfaces of the brass and liner.

5. A journal-box comprising a base and a cap therefor having the adjacent faces thereof curved or recessed to constitute substantially a circular opening, said faces each being provided with notched ribs, a hollow brass formed in duplicate sections and located in said opening with its outer surface in contact with said ribs, thereby forming communicating chambers for a refrigerant, said sections having radial openings therein leading to said chambers, a liner intermediate the sections of the brass and formed with chambers communicating with the chambers first named, said liner also having radial openings leading to the chambers therein, and the inner surfaces of said liner and said brass-sections constituting a direct bearing for a journal, the cap and base being formed with an inlet and an outlet, respectively, for a refrigerant, and means fitting the said radial openings adapted to operate at a predetermined temperature to establish communication between said chambers and said inner surfaces of the brass and liner.

JOHN TOBIN.

Witnesses:
WILLIAM J. SMALL,
CHAS. GOODMAN.